(12) United States Patent
Delson

(10) Patent No.: US 7,683,508 B2
(45) Date of Patent: Mar. 23, 2010

(54) VIBRATION DEVICE

(75) Inventor: Nathan Delson, San Diego, CA (US)

(73) Assignee: Coactive Drive Corporation, New York, NY (US)

( * ) Notice: Subject to any disclaimer, the term of this patent is extended or adjusted under 35 U.S.C. 154(b) by 100 days.

(21) Appl. No.: 11/325,036

(22) Filed: Jan. 4, 2006

(65) Prior Publication Data

US 2006/0157632 A1 Jul. 20, 2006

Related U.S. Application Data

(60) Provisional application No. 60/641,317, filed on Jan. 4, 2005.

(51) Int. Cl.
*H02K 41/00* (2006.01)
(52) U.S. Cl. .............................. 310/21; 310/28; 310/29
(58) Field of Classification Search .................. 310/15, 310/20, 21, 36, 80–81, 27, 28, 29; 15/22.2, 15/26
See application file for complete search history.

(56) References Cited

U.S. PATENT DOCUMENTS

| | | | |
|---|---|---|---|
| 2,447,230 A | | 8/1948 | Brown |
| 4,098,133 A | * | 7/1978 | Frische et al. ................. 73/702 |
| 4,710,656 A | * | 12/1987 | Studer .......................... 310/51 |
| 4,749,891 A | | 6/1988 | Sheng |
| 4,788,968 A | | 12/1988 | Rudashevsky et al. |
| 5,327,120 A | * | 7/1994 | McKee et al. ................ 340/7.6 |
| 5,589,828 A | | 12/1996 | Armstrong |
| 5,643,087 A | | 7/1997 | Marcus et al. |
| 5,666,138 A | | 9/1997 | Culver |
| 5,780,948 A | * | 7/1998 | Lee et al. ...................... 310/81 |
| 5,857,986 A | | 1/1999 | Moriyasu |
| 5,923,317 A | | 7/1999 | Sayler et al. |
| 6,002,184 A | * | 12/1999 | Delson et al. ................. 310/14 |
| 6,009,986 A | * | 1/2000 | Bansemir et al. ............ 188/380 |
| 6,147,422 A | | 11/2000 | Delson et al. |
| 6,275,213 B1 | | 8/2001 | Tremblay et al. |
| 6,307,285 B1 | | 10/2001 | Delson et al. |

(Continued)

OTHER PUBLICATIONS

NanoMuscle Linear Actuator, retrieved from the Internet <http://3w.gfec.com.tw/english/service/content/elinear_actuator.htm> on Jan. 2, 2006, 4 pages.

(Continued)

*Primary Examiner*—Tran N Nguyen
(74) *Attorney, Agent, or Firm*—Lerner, David, Littenberg, Krumholz & Mentlik, LLP

(57) ABSTRACT

The present invention pertains to vibration devices that do not require a rotating mass. In accordance with aspects of the invention, a coil causes a plunger to move linearly. A spring device is coupled to one end of the plunger. Activation of the coil causes the plunger to move in a first direction relative to a body and coil deactivation enables the spring device to move the plunger in an opposite direction relative to the body. Activating the coil at a predetermined frequency causes vibration of the plunger. Vibratory forces are transferred via the spring device and coil onto the body at predetermined locations. Opposing spring devices may be affixed to either end of the plunger. Spring devices may be linear or non-linear. Such spring devices may be used in conjunction with magnetic spring devices. A controller and a driver circuit may be used to control system operation.

24 Claims, 5 Drawing Sheets

U.S. PATENT DOCUMENTS

| | | |
|---|---|---|
| 6,397,285 B1 | 5/2002 | Hashimoto et al. |
| 6,424,333 B1 | 7/2002 | Tremblay et al. |
| 6,641,480 B2 | 11/2003 | Murzanski et al. |
| 6,679,776 B1 | 1/2004 | Nishiumi et al. |
| 6,693,622 B1 | 2/2004 | Shahoian et al. |
| 6,704,001 B1 | 3/2004 | Schena et al. |
| 6,809,727 B2 | 10/2004 | Piot et al. |
| 6,824,468 B2 | 11/2004 | Murzanski et al. |
| 6,864,877 B2 | 3/2005 | Braun et al. |
| 6,982,696 B1 | 1/2006 | Shahoian |
| 6,992,462 B1 | 1/2006 | Hussaini et al. |
| 7,084,854 B1 | 8/2006 | Moore et al. |
| 7,315,098 B2 * | 1/2008 | Kunita et al. ............ 310/15 |
| 7,446,752 B2 | 11/2008 | Goldenberg et al. |
| 7,561,142 B2 | 7/2009 | Shahoian et al. |
| 2002/0024503 A1 | 2/2002 | Armstrong |
| 2004/0108992 A1 | 6/2004 | Rosenberg |
| 2004/0164959 A1 | 8/2004 | Rosenberg et al. |
| 2004/0183782 A1 | 9/2004 | Shahoian et al. |
| 2004/0227727 A1 | 11/2004 | Schena et al. |
| 2004/0233161 A1 | 11/2004 | Shahoian et al. |
| 2004/0233167 A1 | 11/2004 | Braun et al. |
| 2005/0030284 A1 | 2/2005 | Braun et al. |
| 2005/0052415 A1 | 3/2005 | Braun et al. |
| 2005/0128186 A1 | 6/2005 | Shahoian et al. |
| 2005/0134561 A1 | 6/2005 | Tierling et al. |
| 2005/0134562 A1 | 6/2005 | Grant et al. |
| 2005/0195168 A1 | 9/2005 | Rosenberg et al. |
| 2005/0219206 A1 | 10/2005 | Schena et al. |
| 2005/0221894 A1 | 10/2005 | Lum et al. |
| 2005/0237314 A1 | 10/2005 | Ryynanen |

OTHER PUBLICATIONS

Harmon, C. et al, "Multi-Axis Vibration Reduces Test Time", Evaluation Engineering, Jun. 2006, pp. 1-7.

Maor, E., "Trigonometric Delights", Princeton University Press, Princeton, NJ, 1998, pp. 145-149.

Wyle Laboratories, "Multi Axis-Dynamic Vibration System", 2006.

Freeman, M., "3-D Vibration Test System: Powerful, Unusual, International", Test Engineering & Management, Aug./Sep. 1992, pp. 10-12.

Jun. 27, 2006 U.S. Appl. No. 11/476,436, filed Jan. 1, 2000.

* cited by examiner

Postion A

Postion B

VIBRATION DEVICE

CROSS REFERENCE TO RELATED APPLICATIONS

This application claims the benefit of the filing date of U.S. Provisional Patent Application No. 60/641,317 filed Jan. 4, 2005 and entitled "VIBRATION DEVICE," the entire disclosure of which is hereby expressly incorporated by reference herein.

BACKGROUND OF THE INVENTION

The present invention relates generally to vibration devices and more particularly to non-rotary vibration devices.

Vibration devices are used to provide tactile feel in devices such as pagers and telephones. Vibration devices can also be used to provide tactile feedback for computer interfaces and game controllers. Vibration devices can also be used to transfer energy and for vibratory feeders.

Some existing vibration devices are rotary actuators with an eccentric mass. In these devices, the vibration force is proportional to the velocity squared of the rotating mass. A disadvantage of such vibrating devices is that the frequency of vibration is coupled to the vibration amplitude; thus, the vibration amplitude cannot be modulated independently from the vibration frequency. Another limitation of rotary vibration devices is that the vibration force is in a radial direction relative to the axis of rotation of the motor.

Due to the disadvantages and above limitations mentioned above, it may be desired to build a vibration device where the vibration force is not generated from a rotation.

SUMMARY OF THE INVENTION

The present invention overcomes the disadvantages and limitations of known vibration devices by providing means of generating vibration that do not use a rotating mass to generate the vibration force. Numerous embodiments and alternatives are provided below.

In accordance with an embodiment of the present invention, a vibration device is provided. The vibration device comprises a coil for generating an electromagnetic field, a moveable a moveable mass of magnetic material at least partly encircled by the coil, and a spring device. The coil is affixed at a first end to a body. The spring device is coupled at a first end thereof to the moveable mass and affixed at a second end thereof to the body. The moveable mass is operable to move linearly relative to the body upon generation of the electromagnetic field by the coil and to transfer a vibratory force to the body as the mass moves.

In one example, the vibration device further comprises a magnetic end piece coupled to the first end of the coil and to the body adjacent to the first end of the coil. Here, the magnetic end piece is preferably operable to increase magnetic efficiency of the coil and to limit vibration amplitude of the moveable mass. In another example, the spring device comprises first and second spring devices. In this case, the first spring device is coupled at the first end thereof to a first end of the moveable mass and affixed at the second end thereof to a first portion of the body. The second spring device is coupled at the first end thereof to a second end of the moveable mass and affixed at the second end thereof to a second portion of the body. The first and second spring devices are compression fit with the first and second ends of the moveable mass. In this case, the moveable mass may have a length greater or lesser than the length of the coil.

In another example, the spring device is a nonlinear spring device. In this case, the nonlinear spring device may be selected so that a resonant frequency of the vibration device varies according to an amplitude of vibration. Preferably the resonant frequency varies according to the amplitude of vibration so as to simulate a vibratory force of a rotating vibration device. In an alternative, the nonlinear spring device is a hardening spring device. In another alternative, an angle of alignment of the spring device relative to the moveable mass varies based on positioning of the moveable mass.

In a further example, the spring device comprises a pair of nonlinear spring devices. A first one of the nonlinear spring devices is coupled at the first end thereof to a first end of the moveable mass and at the second end thereof to a first location on the body. The second spring device is coupled at the first end thereof to the first end of the moveable mass and at the second end thereof to a second location on the body. In this case, the vibration device may further comprise an aligned spring device. Here, a first end of the aligned spring device is coupled to a second end of the moveable mass opposite the first end thereof, and a second end of the aligned spring device is coupled to a third location on the body.

In yet another example, the spring device is an aligned spring device positioned along a plane of movement of the moveable mass and coupled to a first end of the moveable mass. In this case the vibration device further comprises a magnetic spring device in operative communication with a second end of the moveable mass opposite the first end thereof.

In accordance with another embodiment of the present invention a vibratory system is provided. The vibratory system comprises a coil for generating an electromagnetic field, a moveable mass of magnetic material at least partly encircled by the coil, a spring device and a driving circuit. The coil is affixed at a first end to a body. The spring device is coupled at a first end thereof to the moveable mass and affixed at a second end thereof to the body. The driving circuit is coupled to the coil and is operable to generate a modulation signal for directing operation of the coil. The moveable mass is operable to move linearly relative to the body upon generation of the electromagnetic field by the coil based upon the modulation signal and to transfer a vibratory force to the body as the mass moves.

In one example, the vibratory system further comprises a controller operatively connected to the driving circuit. The controller is operable to specify at least one of an amplitude of vibration and a frequency of vibration of the vibratory system. The controller preferably issues signals to the driving circuit based upon a state in a computer simulation.

In another example the vibratory system further comprises a resonance circuit coupled to the driver circuit for increasing resonance of the vibratory system. In a further example the spring device is a nonlinear spring device. In this case the nonlinear spring device is desirably selected so that a resonant frequency of the vibratory system varies according to an amplitude of vibration.

In accordance with a further embodiment of the present invention, a method of controlling a vibration device is provided. Here, the vibration device may include a coil for generating an electromagnetic field and affixed to a body, a moveable mass of magnetic material at least partly encircled by the coil, a spring device coupled at a first end thereof to the moveable mass and affixed at a second end thereof to the body, and a driving circuit coupled to the coil and operable to generate a modulation signal for directing operation of the coil. The method comprises selecting an activation frequency of the coil to approximate a natural frequency of the moveable mass; generating a control signal; supplying the control signal to the driving circuit; and varying current in the coil with the driving circuit to modulate the activation frequency. In one example, the natural frequency varies based on an amplitude of vibration.

DETAILED DESCRIPTION

Figure 1A:
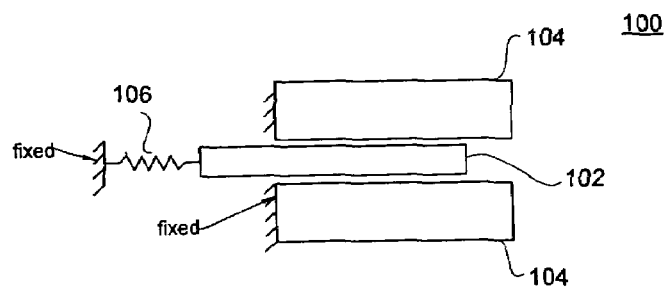
FIGS. 1A-B illustrate a vibration device in accordance with aspects of the present invention.
Figure 1B:
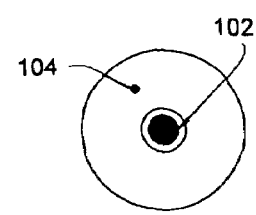

An embodiment of the invention is show in FIGS. 1A-B. As seen in the side view of FIG. 1A, vibration device 100 includes a moveable mass such as plunger 102 surrounded by a coil 104. Preferably, the plunger 102 is substantially or completely encircled by the coil 104. The plunger 102 is attached at one end to a spring device 106, and the spring device 106 is fixed relative to a body (not shown) onto which a vibration force is being applied. The coil 104 is also fixed relative to the body onto which a vibration force is being applied.

The coil 104 and plunger 102 typically have a round cross section, as seen in FIG. 1B. The coil 104 is an electromagnetic coil and can generate an electromagnetic field when current runs through it. The plunger 102 can be made of ferromagnetic material, permanent magnet material, a combination of permanent magnetic and ferromagnetic materials, and/or materials capable of responding to exert a force in response to exposure of the material to a current, voltage, control signal, electromagnetic field, combination thereof or the like.

Figure 2:
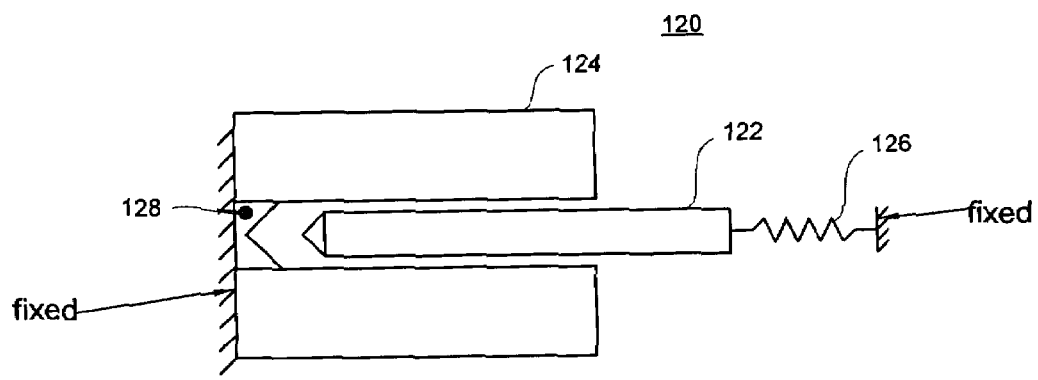
FIG. 2 illustrates a vibration device having an end piece in accordance with aspects of the present invention.

An alternative embodiment of vibration device 120 is illustrated in FIG. 2. As with the vibration device 100, the vibration device 120 includes a plunger 122, a coil 124 and a spring device 126. End piece 128 can be placed at one end of the coil 124 as shown in the figure. When the end piece 128 is ferromagnetic or magnetic it can increase the magnetic efficiency of the coil 124. The configuration without the end piece in FIG. 1 has an advantage that the plunger 102 will not contact an end piece, and thus not limit vibration amplitude. Thus both configurations with an end piece and without an end piece have advantages.

If the plunger 102 or 122 is ferromagnetic it will be attracted to a magnetic field. Thus when the coil 104 or 124 is activated the plunger will be pulled into the coil, and when the coil is deactivated the spring device will pull the plunger back. In this fashion it is possible to create a vibration of the plunger 102 or 122 by activating and deactivating the coil at a desired frequency. Vibration forces are transferred via the spring device 106 or 126 and the coil 104 or 124 onto a body at the locations where they are fixed to the body.

When the plunger 102 or 122 has a permanent magnet material, or a combination of permanent magnet and ferromagnetic material, it can be magnetized along its axis so that one end is magnetic North and the other end is magnetic South. In this configuration the plunger will be attracted into the coil when the current in the coil is operated in one direction. When the current in the coil is operated in another direction, then the plunger will be repelled out outwards from the coil. In this fashion the magnetic forces can apply both an attractive and repulsive force on the plunger, thereby increasing the energy transfer to the plunger. Vibration of the plunger can be generated by controlling the current in the coil. Vibrations can be induced by activating the current in the coil in one direction and then reversing the direction of the current at the desired frequency.

Figure 3:
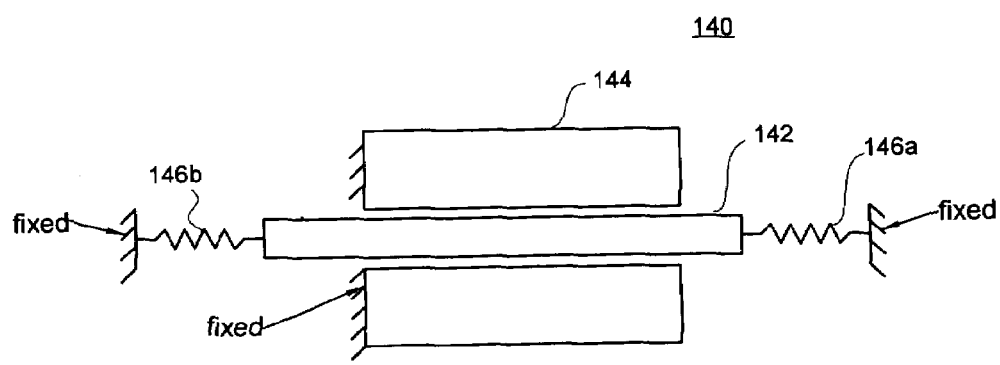
FIG. 3 illustrates a vibration device having opposing spring devices in accordance with aspects of the present invention.

Another embodiment of a device in accordance with the present invention is shown in FIG. 3. Specifically, a side view of vibration device 140 is illustrated. As with the aforementioned embodiments, a plunger 142 is preferably substantially or completely encircled by coil 144. Here spring devices 146a and 146b are disposed on both sides of the plunger 142. An advantage of this configuration is that the spring devices 146a,b can apply compression forces onto the plunger 142. Therefore, the attachment between the plunger 142 and the spring devices 146a,b is simply a compression fit. There is no need for a hole in the plunger 142, which is a common method for attaching extension spring devices.

Figure 4:
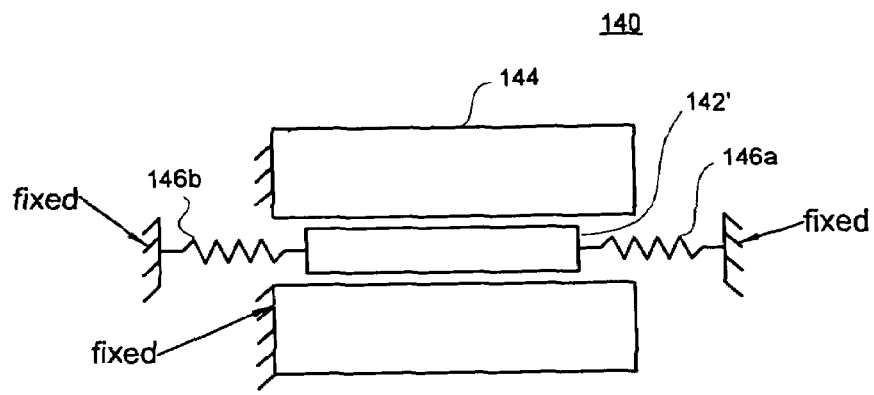
FIG. 4 illustrates a variation of the vibration device of FIG. 3 in accordance with aspects of the present invention.

The plunger can be longer or shorter than the coil. FIG. 3 illustrates the vibration device 140 with the plunger 142 longer than the coil 144. FIG. 4 shows a configuration of the vibration device 140 where plunger 142' is shorter than the coil 144.

A vibrating device which has a mass with a spring device applying a restoring force to the mass can have resonance. When such a system is driven by an exciting force at or close to the resonant frequency large amplitude vibrations can be built up, since the energy from one vibration is transferred to the following vibration. Driving a mass-spring device system at resonance can be used to create large vibration forces from small actuation forces.

Many existing mass-spring device vibration systems have spring devices that provide linear or approximately linear restoring forces. In a mass spring device system with a linear spring device, the resonant frequency of the system is a constant for all amplitude vibrations. Accordingly, vibration systems with linear spring device restoring forces have a narrow frequency range over which resonance can be used to increase the force output of the vibrations. However, it may be desired to operate the vibration device at multiple frequencies.

Figure 5:
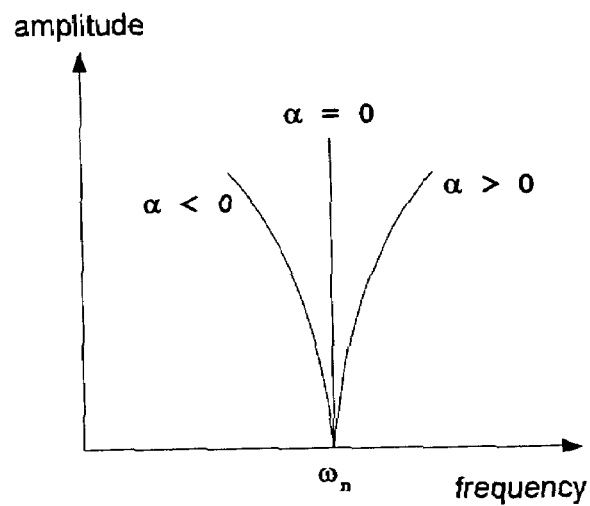
FIG. 5 is a chart plotting frequency versus amplitude for vibration devices in accordance with the present invention.

To overcome the disadvantage of known linear mass-spring device vibrators and take advantage of resonance, one can use a nonlinear spring device in system of the present invention so that the natural frequency will vary as a function of amplitude. In one embodiment, a nonlinear spring device is preferably used to provide a varying resonant frequency of the vibration device, as a function of vibration amplitude. A hardening spring device is one where the restoring force of a spring device increases faster than a linear spring device (corresponding to a in FIG. 5). As shown in FIG. 5, the natural frequency of a mass spring device system with a hardening spring device will increase with increasing amplitudes of vibration.

A nonlinear hardening spring device can be used to provide vibration effects that are similar to those of a rotating vibration device. With a rotating vibration device, the amplitude of vibration force increases as the frequency of rotating increases, due to an increasing centrifugal force. In a similar fashion, a mass spring device system that has a hardening nonlinear spring device will have a lower natural frequency when it is excited at lower amplitudes of vibration, and higher natural frequency at higher amplitudes of vibration. Thus, the mass spring device system could be operated at or close to resonance for different amplitude levels and different frequencies. By operating at or close to resonance, a higher level vibration force can be achieved with low power input.

Figure 6:
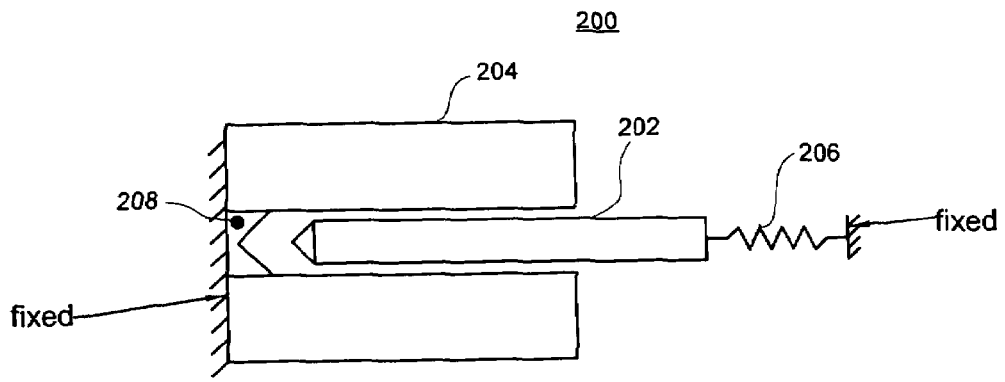
FIG. 6 illustrates a vibration device employing a non-linear spring device in accordance with aspects of the present invention.

Vibration device 200 is shown in FIG. 6. Here, plunger 202 may be substantially or completely encircled or otherwise encompassed by coil 204. A nonlinear spring device 206 is attached to plunger 202. The coil 204 attracts the plunger 202 when it is activated and the nonlinear spring device 206 opposes the plunger force. The spring device 206 and the coil 204 are preferably fixed at either end to the object onto which the vibration force is imparted. A ferromagnetic end piece 208 may be used to improve the magnetic efficiency of the coil 204.

Figure 7:
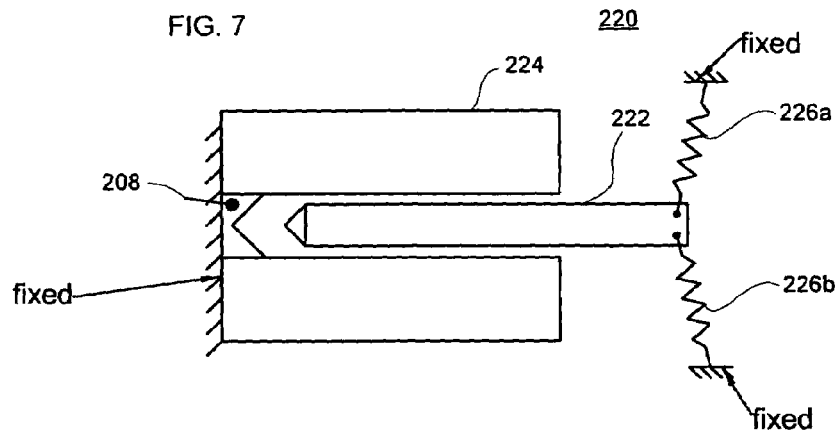
FIG. 7 illustrates another vibration device employing non-linear spring devices in accordance with aspects of the present invention.

An alternative embodiment of vibration device 200 that utilizes a nonlinear spring device resorting force is shown in FIG. 7. As seen in this figure, vibration device 220 includes a plunger 224 and a coil 224. An end piece 228 may be disposed at one end of the coil 224. At least one spring device 226 is attached to the plunger 222 at an angle relative to the axis of motion of the plunger 222. Here, a pair of spring devices 226a and 226b is shown. As the plunger 222 moves, the angle between the spring device 226 (e.g., 226a or 226b) and the plunger 222 varies, thereby creating a nonlinear restoring force, even if the spring device 226 itself is linear. Thus, an effective nonlinear spring device can be created with nonlinear spring device elements or with linear spring device elements that are configured such that the restoring force on the moving mass is nonlinear.

Figure 8A:
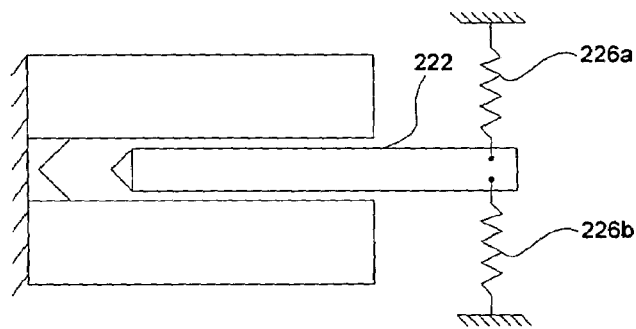
FIGS. 8A-C illustrate actuation of the vibration device of FIG. 7.
Figure 8B:
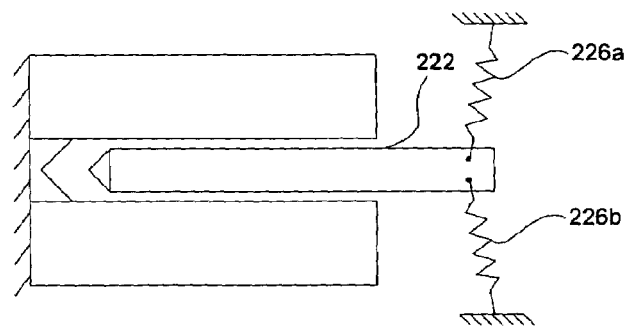
Figure 8C:
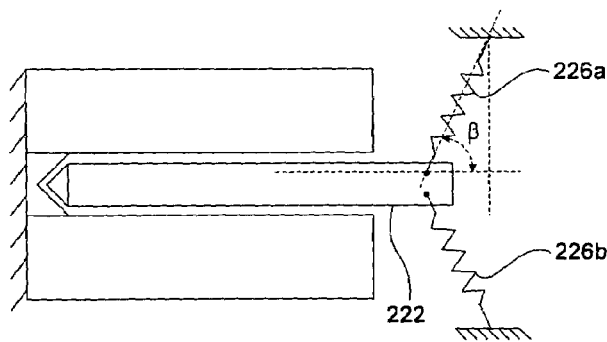

The nonlinearity of the restoring force due to the change in spring device angle is depicted in FIGS. 8A-C. In position A shown in FIG. 8A, the spring devices 226a,b are perpendicular to the axis of motion of the plunger 222, and the net spring device restoring force is zero. In position B shown in FIG. 8B, the plunger 222 is slightly retracted into the coil 224 causing a small angle in the spring devices 226a,b, and resulting in a net small spring device restoring force. In position C shown in FIG. 8C, the plunger 222 is retracted even more into the coil 224, resulting in a larger angle of the spring devices 226a,b and a larger net restoring spring device force. As best seen in FIG. 8C, the net restoring force of the spring devices 226a,b is equal to the vector sum of the spring device forces from each spring device. In the configuration shown in FIG. 8C, this vector sum is twice the magnitude of the force from one spring device multiplied by $\cos(\beta)$, where $\beta$ is the angle between the force vector applied by the spring device and the axis of plunger motion. Thus, the net restoring spring device force increases more rapidly than with a linear spring device, due to the effect of the varying angle. Of course, it should be understood that a nonlinear spring device can also be use with embodiments that do not have an end piece.

Figure 9A:
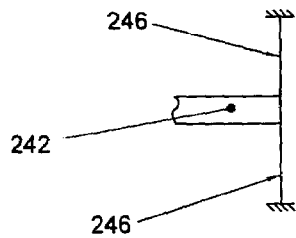
FIGS. 9A-B illustrate aspects of non-linear spring device actuation devices in accordance with the present invention.
Figure 9B:
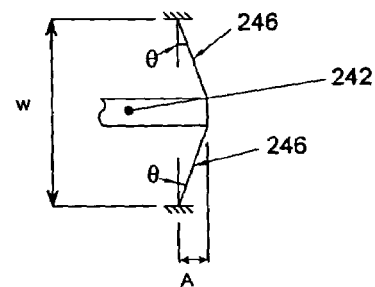

A nonlinear spring device can be attached to a moving mass in any vibration device in accordance with the present invention to increase the range over which resonance can be used to increase the amplitude of vibration. FIGS. 9A and 9B depict a spring device system 240 showing how an elastic element can be attached to a moving mass 242 to create a desired nonlinear spring device effect. In this embodiment an elastic element such as spring device 246 is attached to the moving mass 242 such that the angle between the moving mass 242 and the spring device 246 changes as the mass moves. The spring device 246 may be implemented as one or more spring devices. Even if the elastic element/spring device 246 itself has a mostly linear relationship between its length and internal force, the net force on the moving mass 242 will be nonlinear. As shown in Position A of FIG. 9A, the spring device 246 is vertical and perpendicular to the axis of motion of the moving mass 242. In Position B of FIG. 9B, the mass 242 has moved, which creates an angle θ between the direction of force of the spring device(s) 246 and the axis perpendicular to the direction of motion of the moving mass 242. As the angle θ increases, the effective stiffness of the spring devices 246, as applied onto the moving mass 242, increases. This creates the effect that at low vibration amplitudes the effective stiffness will be low and the resonant frequency will be low. At higher amplitude vibrations the effective stiffness will increase and the resonant frequency of the system will increase.

One can select the desired nonlinearity of the spring device system 240 by choosing the width W between endpoints of the spring devices, and the amplitude of vibration, A, as best shown in FIG. 9B. A small value for W will result in a larger change in angle θ for a given amplitude of vibration, A, and thus increase the nonlinearity.

A nonlinear spring device attached to a moving mass of a vibrating device that uses a mass and spring device to generate vibrations can be used to simulate the vibration achieved with a rotating vibrating device. With a rotating vibration device the amplitude of force increase with increased frequency of rotation. With a nonlinear spring device, low frequency resonance will occur at low amplitude vibrations, which corresponds to the low amplitude forces of the rotating vibrator at low frequencies. With a nonlinear spring device, higher frequency resonance will occur at higher amplitude vibrations, which corresponds to the higher amplitude forces of the rotating vibrator at higher frequencies.

In the configuration shown in FIGS. 9A-B, both the top and bottom spring device 246 can be made of a single element. The top and bottom spring devices 246 cancel out forces that are not in the direction of motion of the moving mass 242, which is the vertical direction in FIGS. 9A-B. However, an alternative configuration could use only a single spring device element 246. The bearing guide (not shown) for the moving mass 242 will provide the necessary reaction forces that keep the moving mass 242 within the bearing guide.

In the present invention, a nonlinear spring device can also be use where the plunger or moving mass is ferromagnetic or a permanent magnet. When the plunger is a permanent magnet, the coil can create magnetic forces that attract the plunger, and by reversing the direction of current in the coil, it can create repulsive magnetic forces.

Figure 10:
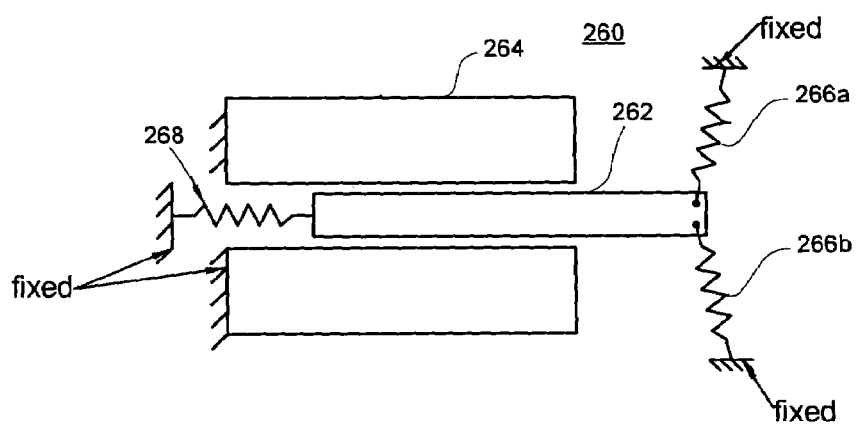
FIG. 10 illustrates a vibration device employing non-linear spring devices and an aligned spring device in accordance with aspects of the present invention.

A nonlinear spring device can also be use in combination with a linear spring device, as shown in FIG. 10. In this figure, vibration device 260 is presented having plunger 262 and coil 264. Here, spring device 268 is aligned with the axis of motion of the plunger 262, and could be a linear spring device. Angled spring devices 266a and 266b are attached to the plunger 262 such that their angle varies as the plunger 262 moves, thereby creating a nonlinear restoring force. The combined effect of the linear spring device 268 and nonlinear spring devices 268a,b is a nonlinear restoring force that can be used to generate varying natural frequencies of the system 260.

The angled spring devices shown in the various embodiments herein can be implemented with a single spring device piece, whereby the spring device element passes through a hole or slot in the plunger. The spring devices could be made of metal or elastic (such as a rubber band). The nonlinear spring device(s) could also be formed of a cable in series with a spring device. The cable could easily be attached to the moving mass/plunger.

Techniques may also be used to couple programmable devices varying natural frequency into the vibration device or otherwise change the natural frequency by electronic or external control. By integrating actively controlled shape memory alloys ("SMA"), bipoles, strain gauges such as resistive strain gauges, piezoelectrics, devices such as Nanomuscle-brand actuators, or other suitable materials or devices that are capable of producing a movement when exposed to electric current into the springs, one can adjust the restoring force of the springs dynamically. Modulation schemes to programmably control natural frequency can be optimized for any particular angle of the spring device to the plunger motion.

It is also possible to generate a magnetic spring device. Several patents assigned to Coactive Drive Corporation describe magnetic spring devices using repulsive forces. Such patents include U.S. Pat. Nos. 6,002,184, 6,147,422 and 6,307,285, the entire disclosures of which are incorporated fully by reference herein. It is possible to modulate the stiffness of such magnetic spring devices by modulating the current in the spring device-coils. As shown in the aforementioned Coactive Drive Corporation patents, these spring devices can be configured though opposing repulsive magnetic forces, or through a single repulsive magnetic force opposed by a mechanical spring device. In either case the stiffness of the spring device can be modulated. The magnetic spring device can be configured in series or parallel with mechanical spring devices.

In an embodiment of the invention, a magnetic spring device is employed to achieve the restoring force of the spring device shown in FIGS. 1A-B. In this case, the stiffness of the magnetic spring device can be modulated to change the resonant frequency of the vibration device. The modulation of frequency can used to provide high amplitude vibration forces over a wide range of frequencies.

Figure 11:
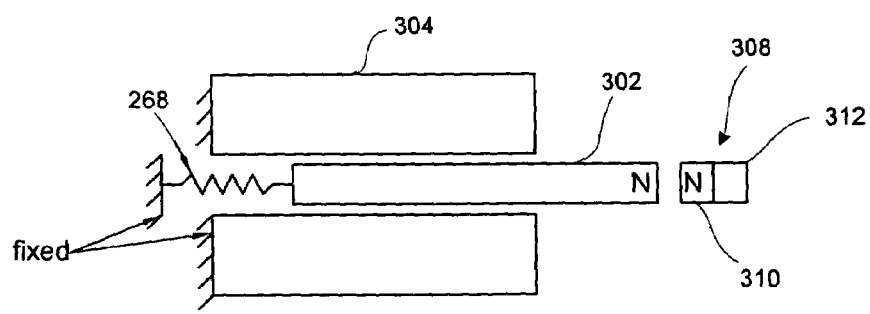
FIG. 11 illustrates a vibration device employing a magnetic coil in accordance with aspects of the present invention.

An embodiment with a magnetic coil is shown in FIG. 11. Vibration device 300 is illustrated having a plunger 302 and a coil 304 about the plunger 302. Here, by way of example only, the plunger end is magnetized such that it has a North pole as indicated by the N at its right side. The plunger 302 may contain permanent magnet material which has been magnetized in this orientation. Alternately the plunger 302 may have ferromagnetic material, and the coil 304 creates the magnetization in the plunger 302. The plunger 302 is attached on the left hand side of the figure with a mechanical spring device 306. On the right hand side of the figure is a magnetic spring device 308. The magnetic spring device preferably contains a permanent magnet 310 which has, for instance, a North pole at its left end as indicated by the N in the figure. The magnetic force between the plunger 302 and the permanent magnet 310 in the configuration shown is repulsive. A secondary coil 312 is desirably close to the permanent magnet 310 of the magnetic spring device 308. When the secondary coil 312 is activated it can increase or decrease the stiffness of the magnetic spring device 308 depending on the direction of current in the secondary coil 312. The stiffness of the magnetic spring device 308 can be modified to create the desired resonant frequency of the system.

Figure 12:
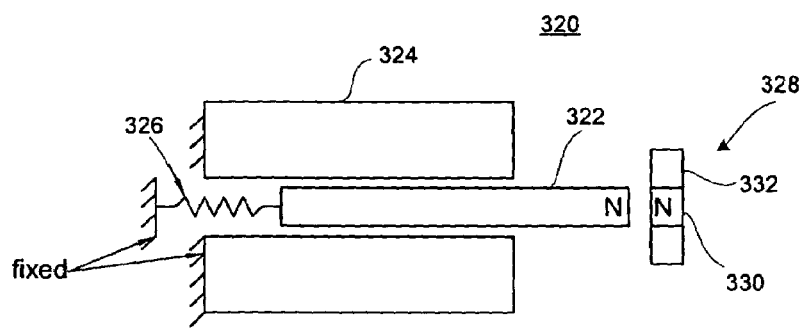
FIG. 12 illustrates another vibration device employing a magnetic coil in accordance with aspects of the present invention.

In FIG. 11 the secondary coil 312 is behind the permanent magnet 310 of the magnetic spring device 308. An alternative configuration of the vibration device 300, namely vibration device 320, is shown in FIG. 12. As with the embodiment of FIG. 11, the vibration device 320 includes a plunger 322, a coil 324, a mechanical spring device 326 and a magnetic spring device 328. In this embodiment, secondary coil 332 preferably surrounds permanent magnet 330 of the magnetic spring device 328.

Figure 13:
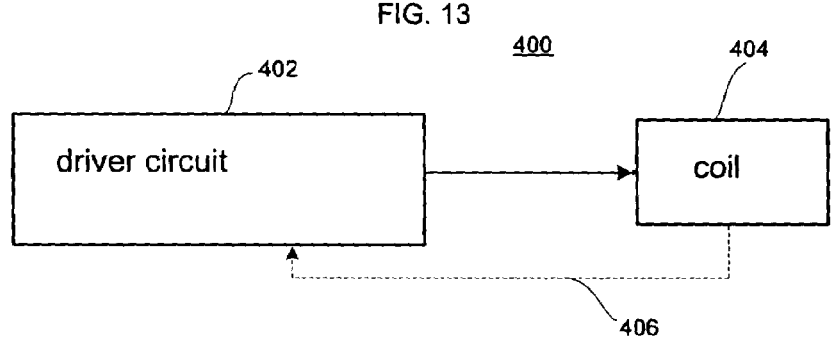
FIG. 13 illustrates a driver circuit in accordance with aspects of the present invention.

The vibrating devices according to the embodiments of the invention herein may include a driver circuit for actuating the coil(s). FIG. 13 is a block diagram of system 400 illustrating a driver circuit 402 connected to coil 404. Information such as the operating status of the coil 404 may be fed back to the driver circuit 402, either directly or indirectly, as shown with dashed line 406. The driver circuit 402 provides current to the coil 404. The driver circuit 402 modulates the current in the coil 404 at the desired frequency of vibration. The modulation can be in the form of a sine wave, square wave, rectangle wave, triangle wave, or other shape. For example the driver circuit 402 could use a CMOS 555 timer chip, which generates a rectangle wave.

Figure 14:
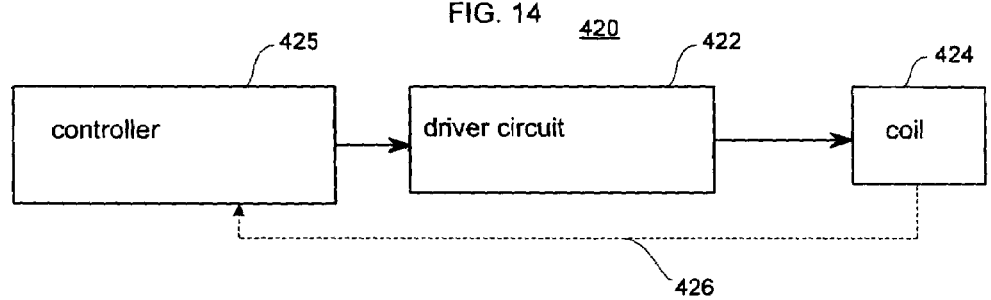
FIG. 14 illustrates a driver circuit and a controller in accordance with aspects of the present invention.

The driver circuit for the vibrator described herein may receive a signal from a controller, such as in system 420 shown in FIG. 14. Here, driver circuit 422 is connected to coil 424 as well as to controller 425. The signal from the controller 425 may specify the desired amplitude and frequency of vibration. The signal from the controller 425 may indicate a desired vibration sensation. The signal from the controller 425 may correspond to a state in a computer simulation such as in a game. For example a specified vibration frequency may correspond to a simulated vehicle driving over a rough road in a computer game. Information such as the operating status of the coil 424 may be fed back to the driver circuit 422 or the controller 425. As shown by dashed line 426 in FIG. 14, coil information is preferably passed (either directly or indirectly) from the coil 424 to the controller 425. The controller 425 may be, e.g., a general purpose processor, a microprocessor, a digital signal processor, an ASIC, or logic circuits configured to manage operation of the driver circuit 422 and/ or the coil 424.

The control signal from a controller, such as the controller 425, may be a digital signal or an analog signal. There may be one signal or multiple signals. In one embodiment the signal from the controller is an analog signal, where a low voltage corresponds to a desired low frequency of vibration and a desired higher voltage correspond to a higher frequency of vibration. A driver circuit for such an embodiment can include a voltage to frequency converter that will drive the coil at the desired frequencies according to the signal from the controller.

Driving a vibrating device according to the present invention at or close to resonance can generate relatively large vibration forces from small actuators and with use of low amounts of electrical power. In one alternative, the driver circuit for the coil desirably includes electrical resonance to increase the overall resonance effect in the system.

Figure 15:
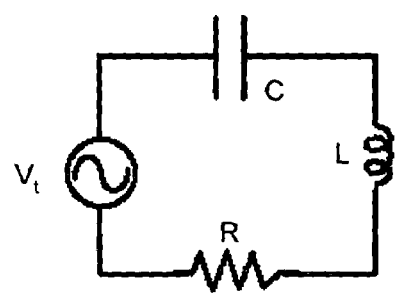
FIG. 15 illustrates an RLC circuit in accordance with aspects of the present invention.

When current to the coil is shut off, there is remaining energy in the electromagnetic field. As the field collapses this energy can be transferred into a capacitor, which is then returned to the coil in a following coil activation. This embodiment can be in the form of an LC (inductor-capacitor) or LCR (inductor-capacitor-resistor) circuit. The coil provides both inductance and resistance. Accordingly, a capacitor can be added to the circuit with a chosen value so that the electrical resonance will be at or close to the desired driving resonance of the vibration device. An embodiment of an LCR (also referred to as an RLC) circuit is shown in FIG. 15. In this figure, V(t) indicates the varying driving frequency, which can be in the form of a sine wave, square wave, rectangle wave, triangle wave, or other form.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For example, the plunger and/or springs may be comprised of various materials. They may be integrated with active materials such as shaped memory alloys, bipoles, Nanomuscle-brand devices, strain gauges, piezoelectrics, etc. The actuation force to compel movement of the plunger may be caused in whole or in part by active material in the plunger and/or springs. The actuation force may also be a combination of modulation of the active material and the electromagnetic field. The natural frequency of the system may be modified by control of the active material in or around the plunger and/or springs. Active material may also be used to sharpen, dampen or contribute to the actuation, effect, dampening, linearity or manipulation of the device and haptic experience gained thereby.

The invention claimed is:

1. A vibration device, comprising:
 a coil for generating an electromagnetic field, the coil being affixed at a first end to a body;
 a moveable mass of magnetic material at least partly encircled by the coil; and
 a nonlinear spring device coupled at a first end thereof to the moveable mass and affixed at a second end thereof to the body;
 wherein the moveable mass is operable to move linearly relative to the body upon generation of the electromagnetic field by the coil and to transfer a vibratory force to the body as the mass moves; and
 wherein a resonant frequency of the vibration device increases as a stiffness of the nonlinear spring device increases and wherein the resonant frequency of the vibration device decreases as the stiffness of the nonlinear spring device decreases, and wherein the nonlinear spring device is a hardening spring device.

2. The vibration device of claim 1, further comprising a magnetic end piece coupled to the first end of the coil and to the body adjacent to the first end of the coil, wherein the magnetic end piece is operable to increase magnetic efficiency of the coil and to limit vibration amplitude of the moveable mass.

3. The vibration device of claim 1, wherein the nonlinear spring device has a first stiffness at a first vibration amplitude and has a second stiffness at a second vibration amplitude, the first stiffness being less than the second stiffness and the first vibration amplitude being less than that second vibration amplitude.

4. The vibration device of claim 1, wherein the moveable mass has a length greater than a length of the coil.

5. A vibration device, comprising:
 a coil for generating an electromagnetic field, the coil being affixed at a first end to a body;
 a moveable mass of magnetic material at least partly encircled by the coil; and
 a nonlinear spring device coupled at a first end thereof to the moveable mass and affixed at a second end thereof to the body, the nonlinear spring device including a pair of linear spring device elements configured such that a restoring force on the moveable mass is nonlinear;
 wherein the moveable mass is operable to move linearly relative to the body upon generation of the electromagnetic field by the coil and to transfer a vibratory force to the body as the mass moves;
 wherein a resonant frequency of the vibration device increases as a stiffness of the nonlinear spring device increases and wherein the resonant frequency of the vibration device decreases as the stiffness of the nonlinear spring device decreases; and
 wherein the nonlinear spring device is selected so that a resonant frequency of the vibration device varies according to an amplitude of vibration.

6. The vibration device of claim 5, wherein the resonant frequency varies according to the amplitude of vibration so as to simulate a vibratory force of a rotating vibration device.

7. The vibration device of claim 1, wherein an angle of alignment of the nonlinear spring device relative to the moveable mass varies based on positioning of the moveable mass.

8. A vibration device, comprising:
 a coil for generating an electromagnetic field, the coil being affixed at a first end to a body;
 a moveable mass of magnetic material at least partly encircled by the coil; and
 a nonlinear spring device coupled at a first end thereof to the moveable mass and affixed at a second end thereof to the body;
 wherein the moveable mass is operable to move linearly relative to the body upon generation of the electromagnetic field by the coil and to transfer a vibratory force to the body as the mass moves, and
 wherein the nonlinear spring device comprises a pair of nonlinear spring devices, a first one of the nonlinear spring devices is coupled at the first end thereof to the moveable mass and at the second end thereof to a first location on the body, and a second one of the spring devices is coupled at the first end thereof to the moveable mass and at the second end thereof to a second location on the body.

9. The vibration device of claim 8, further comprising an aligned spring device, a first end of the aligned spring device being coupled to a second end of the moveable mass opposite the first end thereof, and a second end of the aligned spring device being coupled to a third location on the body.

10. The vibration device of claim 9, wherein the vibration device further comprises a magnetic spring device in operative communication with a second end of the moveable mass opposite the first end thereof.

11. A vibratory system, comprising:
 a coil for generating an electromagnetic field, the coil being affixed at a first end to a body;
 a moveable mass of magnetic material at least partly encircled by the coil;
 a nonlinear spring device coupled at a first end thereof to the moveable mass and affixed at a second end thereof to the body, the nonlinear spring device including a pair of linear spring device elements configured such that a restoring force on the moveable mass is nonlinear;

a driving circuit coupled to the coil and being operable to generate a modulation signal for directing operation of the coil; and a controller operatively connected to the driving circuit, wherein the controller is operable to specify at least one of an amplitude of vibration and a frequency of vibration of the vibratory system;

wherein the moveable mass is operable to move linearly relative to the body upon generation of the electromagnetic field by the coil based upon the modulation signal and to transfer a vibratory force to the body as the mass moves; and wherein the nonlinear spring device is selected so that a resonant frequency of the vibratory system varies according to an amplitude of vibration.

12. The vibratory system of claim 11, wherein the controller issues signals to the driving circuit based upon a state in a computer simulation.

13. The vibratory system of claim 11, further comprising a resonance circuit coupled to the driver circuit for increasing resonance of the vibratory system.

14. The vibratory system of claim 11, wherein an angle of alignment of the nonlinear spring device relative to the moveable mass varies based on positioning of the moveable mass.

15. The vibration device of claim 1, wherein the nonlinear spring device is disposed along an axis perpendicular to the direction of motion of the moveable mass during a rest state.

16. The vibration device of claim 8, wherein each respective nonlinear spring device is selected so that a resonant frequency of the respective vibration device varies according to an amplitude of vibration.

17. The vibration device of claim 16, wherein the resonant frequency varies according to the amplitude of vibration so as to simulate a vibratory force of a rotating vibration device.

18. The vibration device of claim 8, wherein each nonlinear spring device is a hardening spring device.

19. The vibration device of claim 8, wherein an angle of alignment of each nonlinear spring device relative to the moveable mass varies based on positioning of the moveable mass.

20. The vibration device of claim 8, further comprising:

a driving circuit coupled to the coil and being operable to generate a modulation signal for directing operation of the coil; and a controller operatively connected to the driving circuit, wherein the controller is operable to specify at least one of an amplitude of vibration and a frequency of vibration of the vibratory system.

21. The vibratory system of claim 20, wherein the controller issues signals to the driving circuit based upon a state in a computer simulation.

22. The vibratory system of claim 11, wherein the resonant frequency varies according to the amplitude of vibration so as to simulate a vibratory force of a rotating vibration device.

23. A vibration device, comprising:

a coil for generating an electromagnetic field, the coil being affixed at a first end to a body;

a moveable mass of magnetic material at least partly encircled by the coil, the moveable mass being operable to move linearly relative to the body upon generation of the electromagnetic field by the coil and to transfer a vibratory force to the body as the mass moves; and a nonlinear spring device comprising a pair of spring devices, a first one of the spring devices being coupled to the moveable mass and to a first location on the body, and a second one of the spring devices being coupled to the moveable mass and to a second location on the body.

24. The vibration device of claim 23, wherein the first and second spring devices are linear spring devices.

* * * * *